United States Patent
Kim et al.

(10) Patent No.: US 9,184,450 B2
(45) Date of Patent: Nov. 10, 2015

(54) LI-AIR HYBRID BATTERY AND METHOD FOR MANUFACTURING THE SAME

(75) Inventors: Dong Hui Kim, Seoul (KR); Sam Ick Son, Gyeonggi-do (KR); Kyoung Han Ryu, Gyeonggi-do (KR); Jun Ki Rhee, Gyeonggi-do (KR); Yun Seok Kim, Gyeonggi-do (KR); Ho Taek Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 598 days.

(21) Appl. No.: 13/280,698

(22) Filed: Oct. 25, 2011

(65) Prior Publication Data
US 2013/0011750 A1 Jan. 10, 2013

(30) Foreign Application Priority Data
Jul. 7, 2011 (KR) .................. 10-2011-0067313

(51) Int. Cl.
*H01M 12/08* (2006.01)
*H01M 4/86* (2006.01)
(Continued)

(52) U.S. Cl.
CPC ............ *H01M 4/8626* (2013.01); *H01M 4/382* (2013.01); *H01M 4/881* (2013.01); *H01M 4/8828* (2013.01); *H01M 4/8878* (2013.01); *H01M 12/08* (2013.01); *H01M 4/0407* (2013.01); *H01M 10/38* (2013.01); *H01M 12/06* (2013.01); *H01M 2004/8689* (2013.01); *H01M 2220/20* (2013.01); *H01M 2250/20* (2013.01); *H01M 2300/0068* (2013.01); *H01M 2300/0082* (2013.01); *Y02E 60/50* (2013.01); *Y02T 90/32* (2013.01)

(58) Field of Classification Search
CPC ................ H01M 12/08; H01M 12/06; H01M 2300/0068; H01M 4/0407; H01M 10/38
See application file for complete search history.

(56) References Cited

U.S. PATENT DOCUMENTS 7,645,543 B2 1/2010 Visco et al.
2002/0048706 A1* 4/2002 Mayes et al. ................ 429/231.1
(Continued)

FOREIGN PATENT DOCUMENTS

WO WO 2010/100752 * 9/2010 .......... H01M 10/052
WO 2011023110 A1 3/2011

OTHER PUBLICATIONS

Wang et al., "A lithium-air battery with a potential to continuously reduce O2 from air for delivering energy", Journal of Power Sources, vol. 195, pp. 358-361 (2010).
(Continued)

*Primary Examiner* — Jeremiah Smith
(74) *Attorney, Agent, or Firm* — Mintz Levin Cohn Ferris Glovsky and Popeo, P.C.; Peter F. Corless

(57) ABSTRACT

The present invention provides a lithium-air hybrid battery and a method for manufacturing the same, which has a structure in which a liquid electrolyte electrode and a solid electrolyte electrode are stacked on both sides of an ion conductive glass ceramic. That is, disclosed is a lithium-air hybrid battery and a method for manufacturing the same, which has a structure in which a lithium metal negative electrode includes a liquid electrolyte and a porous air positive electrode comprising a carbon, a catalyst, a binder and a solid electrolyte are separately stacked on both sides of an impermeable ion conductive glass ceramic, and the liquid electrolyte is present only in the lithium metal negative electrode.

6 Claims, 8 Drawing Sheets

(51) Int. Cl.
  *H01M 4/38* (2006.01)
  *H01M 4/88* (2006.01)
  *H01M 4/04* (2006.01)
  *H01M 10/38* (2006.01)
  *H01M 12/06* (2006.01)

(56) References Cited

U.S. PATENT DOCUMENTS

| | | | |
|---|---|---|---|
| 2004/0197641 A1* | 10/2004 | Visco et al. | 429/137 |
| 2006/0115579 A1* | 6/2006 | Mukherjee et al. | 427/58 |
| 2006/0147798 A1* | 7/2006 | Lu et al. | 429/224 |
| 2006/0166085 A1* | 7/2006 | Hennige et al. | 429/128 |
| 2007/0037043 A1* | 2/2007 | Chang et al. | 429/50 |
| 2011/0305974 A1* | 12/2011 | Nakanishi | 429/521 |
| 2012/0040254 A1* | 2/2012 | Amendola et al. | 429/406 |
| 2012/0064404 A1* | 3/2012 | Carlson | 429/211 |

OTHER PUBLICATIONS

Wang et al., "A lithium-air fuel cell using copper to catalyze oxygen-reduction based on copper-corrosion mechanism", Chem. Commun., vol. 46, pp. 6305-6307 (2010).

Hasegawa et al., "Study on lithium/air secondary batteries—Stability of NASICON-type lithium ion conducting glass-ceramics with water", Journal of Power Sources, vol. 189, pp. 371-377 (2009).

Zhang et al., "Stability of a Water-Stable Lithium Metal Anode for a Lithium-Air Battery with Acetic Acid-Water Solutions", Journal of Electrochemical Society, vol. 157, No. 2, pp. A214-A218 (2010).

* cited by examiner

US 9,184,450 B2

LI-AIR HYBRID BATTERY AND METHOD FOR MANUFACTURING THE SAME

CROSS-REFERENCE TO RELATED APPLICATION

This application claims under 35 U.S.C. §119(a) the benefit of Korean Patent Application No. 10-2011-0067313 filed Jul. 7, 2011, the entire contents of which are incorporated herein by reference.

BACKGROUND (a) Technical Field

The present invention relates to a lithium-air hybrid battery. More particularly, it relates to a lithium-air hybrid battery and a method for manufacturing the same, which has a structure in which a liquid electrolyte electrode and a solid electrolyte electrode are stacked on both sides of an ion conductive glass ceramic.

(b) Background Art

While lithium-ion batteries for hybrid and electric vehicles developed so far satisfy plug-in hybrid electric vehicles (PHEVs) used for short-distance travel, a new energy storage system capable of storing much more energy is required for electric vehicles used for long-distance travel. Among the energy storage systems known so far, a lithium-air battery has a high theoretical capacity. According to the lithium-air battery, during discharge, lithium cations migrate from a lithium metal to a positive electrode through an electrolyte and react with oxygen supplied from the air to produce lithium oxide (such as $Li_2O$ or $Li_2O_2$). At this time, electrons migrate from a negative electrode to the positive electrode through an electrical circuit.

As shown in FIG. 8, a conventional lithium-air battery typically includes a lithium metal negative electrode 1, an air positive electrode 2, and a separator 3 disposed between the lithium metal negative electrode 1 and the air positive electrode 2, and a liquid electrolyte 4 is included in the lithium metal negative electrode 1 and the air positive electrode 2, respectively.

During discharge of the conventional lithium-air battery, lithium ions ($Li^+$) are deintercalated from the lithium metal negative electrode 1, dissolved in the liquid electrolyte 4, and passed through the separator 3, and then moved to the surface of the air positive electrode 2. On the surface of the air positive electrode 2, the lithium ions react with oxygen supplied from the air to produce lithium oxide and, at this time, charges move from the lithium metal negative electrode 1 to the air positive electrode 2. The separator 3 employed in the conventional lithium-air battery is made of glass fiber or PE-PP material, and both the lithium metal negative electrode 1 and the air positive electrode 2 include the liquid electrolyte 4. As the liquid electrolyte 4, a carbonate solvent having high ion conductivity and low volatility is typically used.

However, the electrolyte of the conventional lithium-air battery contains a volatile solvent, and thus a membrane and a gas diffusion layer (GDL) for preventing volatilization of the electrolyte are provided on the air positive electrode 2 in a position open to the outside. However, the present membranes and GDLs limit the dispersion of oxygen and/or do not inherently prevent the volatilization of the electrolyte, which is very problematic.

Moreover, during the volatilization of the electrolyte, an electrolyte limitation occurs in a battery cell, which shortens the lifespan of the battery, and the moisture in the air passing through the membrane is dissolved in the electrolyte and move to the negative electrode to cause a side reaction with the lithium metal. Further, when a liquid electrolyte is used, the air positive electrode should have an open structure to allow the liquid electrolyte to be in contact with the air, and thus the open position should be fixed (in a direction opposite to gravity). This structure, however, makes it very difficult to employ a stacking structure for increasing the energy density of the battery.

Furthermore, the amount of lithium carbonate ($LiCO_3$) or lithium alkyl carbonate ($Li-R-CO_3$) produced by the decomposition of the electrolyte is much greater than the amount of lithium oxide produced as a discharge product of the air positive electrode in a structure where a carbonate-based liquid electrolyte comes into contact with oxygen, which significantly shortens the lifespan of the lithium-air battery. As such, research on appropriate catalysts and carbon materials used in the air positive electrode of the lithium-air battery is important, but the research on the electrolyte materials is also very important.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a lithium-air hybrid battery and a method for manufacturing the same, which has a structure in which a lithium metal negative electrode includes a liquid electrolyte and a porous air positive electrode comprising a carbon, a catalyst, a binder and a solid electrolyte are separately stacked on both sides of an impermeable ion conductive glass ceramic, and the liquid electrolyte is present just in the to lithium metal negative electrode.

In one aspect, the present invention provides a lithium-air hybrid battery including: an ion conductive glass ceramic; a lithium metal negative electrode comprising a liquid electrolyte and bonded to one side of the ion conductive glass ceramic; a porous solid electrolyte air positive electrode prepared by mixing a carbon, a catalyst, a binder, a solid electrolyte, a solvent, and a filler in a predetermined ratio and coating and drying the mixture on the other side of the ion conductive glass ceramic; a negative electrode current collector attached to an outer surface of the lithium metal negative electrode; and a positive electrode current collector attached to an outer surface of the porous solid electrolyte air positive electrode.

In an exemplary embodiment, the porous solid electrolyte air positive electrode coated on the ion conductive glass ceramic may be stacked in both directions with respect to the lithium metal negative electrode comprising the liquid electrolyte.

In one aspect, the present invention provides a method for manufacturing a lithium-air hybrid battery, the method comprising: injecting a liquid electrolyte prepared by mixing a lithium salt and a solvent into the top of a lithium metal negative electrode including a negative electrode current collector attached to the bottom thereof; preparing a porous solid electrolyte air positive electrode on an ion conductive glass ceramic by coating; fixing the ion conductive glass ceramic coated with the porous solid electrolyte air positive electrode onto to the liquid electrolyte; and attaching a porous positive electrode current collector having an air path to the top of the porous solid electrolyte air positive electrode.

In an exemplary embodiment, the preparing the porous solid electrolyte air positive electrode may comprise: preparing a slurry by mixing a carbon, a catalyst, a binder, a solid electrolyte, a solvent, and a filler in a predetermined ratio; coating the prepared slurry on an ion conductive glass ceramic and drying the coated slurry; allowing the solvent to volatilize during the drying such that pores are formed in places where the solvent volatilizes; and immersing the slurry coated and dried on the ion conductive glass ceramic in a solvent, in which the filler is to be dissolved, to extract the filler such that pores are formed in places where the filler is extracted.

In another exemplary embodiment, the binder may be any one selected from the group consisting of PEO, PVdF and PVdF-HFP.

In still another exemplary embodiment, the solid electrolyte may be a material having lithium ion conductivity such as a ceramic solid electrolyte or a polymer solid electrolyte.

In yet another exemplary embodiment, the solvent may be acetone capable of volatilizing.

In still yet another exemplary embodiment, the filler may be dibutyl phthalate (DBP).

In a further exemplary embodiment, the slurry may be prepared by mixing the carbon, the catalyst, and a mixture of binder and solid electrolyte in a ratio of 40%:20%:40%, in which the binder and the solid electrolyte are mixed in a ratio of 50%:50%, by adding the solvent in an amount that maintains the concentration of the total solid about 10%, and by adding the filler in an amount of 10% with respect to the carbon.

In another further exemplary embodiment, the method may further comprise coating a slurry prepared by mixing a carbon, a catalyst, a binder, and a solid electrolyte on the surface of the solid electrolyte air positive electrode again.

In still another further exemplary embodiment, the preparing the porous solid electrolyte air positive electrode may further comprise: coating a solid electrolyte and a binder layer on a metal foam having pores, drying the coated materials; and coating a slurry prepared by mixing a carbon, a catalyst, a binder, and a solid electrolyte on the surface thereof again.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
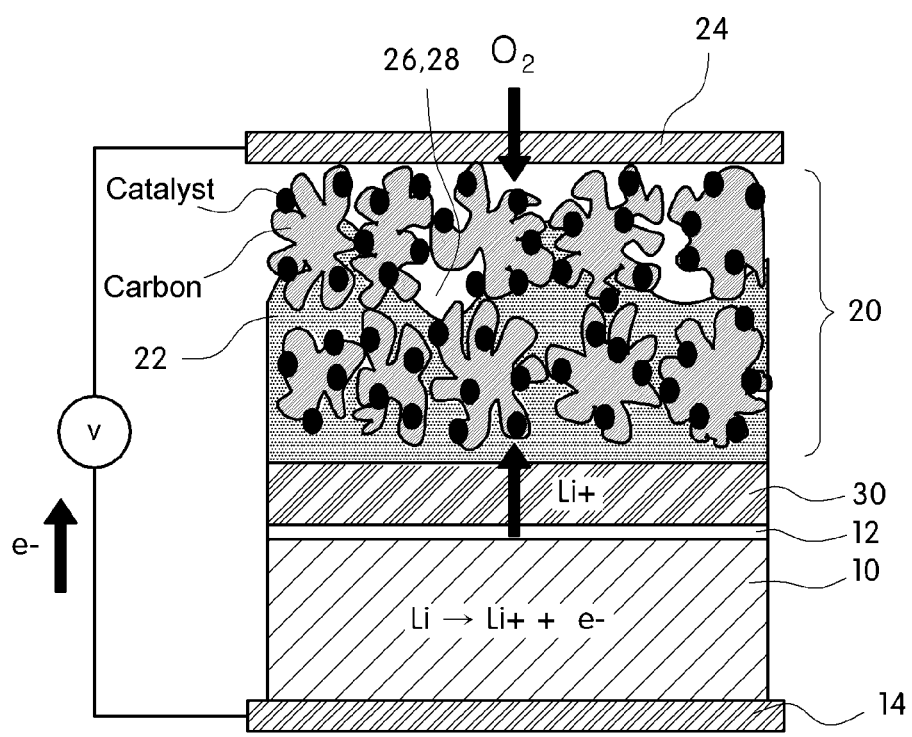
FIG. 1 is a conceptual diagram showing a lithium-air hybrid battery system in accordance with an exemplary embodiment of the present invention.
Figure 2:
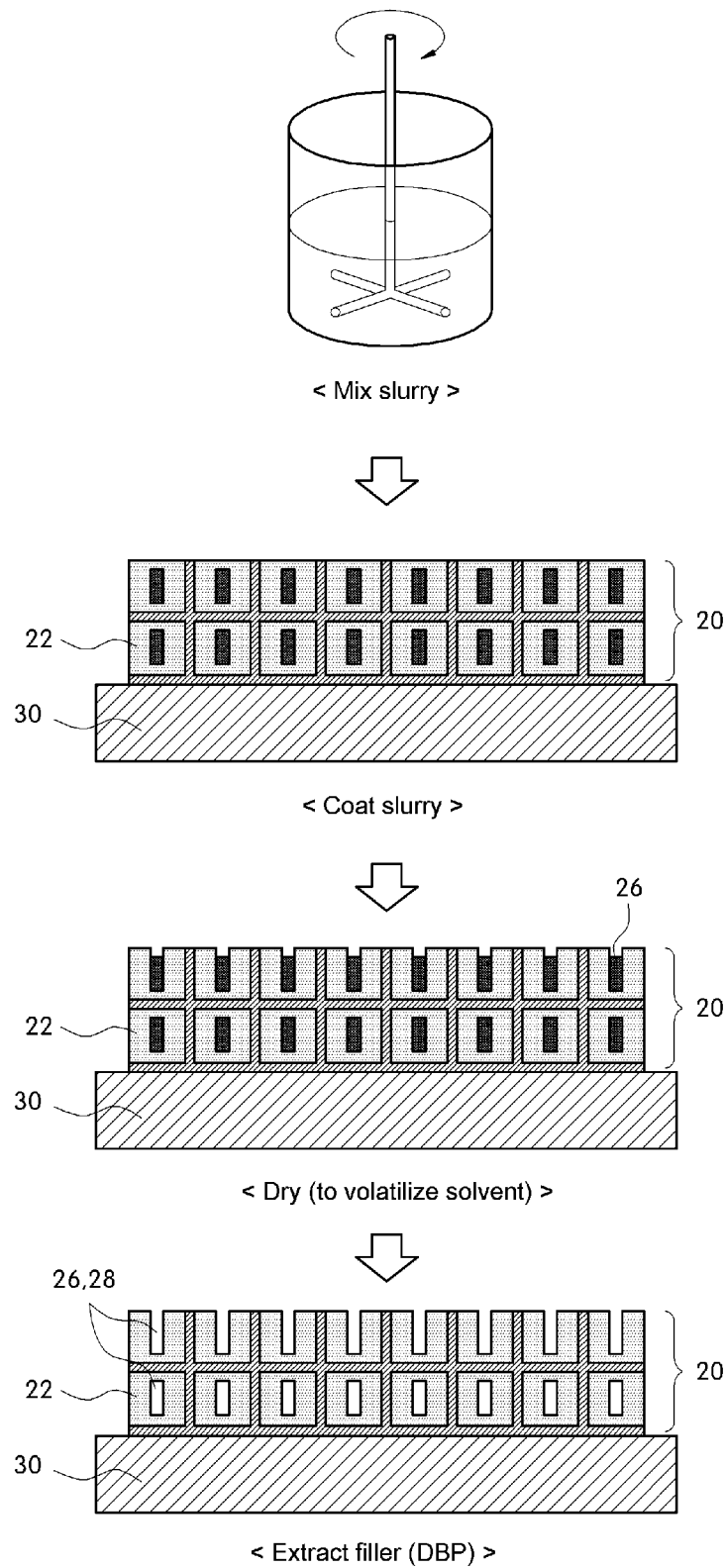
FIG. 2 is a process diagram showing a method for manufacturing a lithium-air hybrid battery system in accordance with another exemplary embodiment of the present invention.
Figure 3:
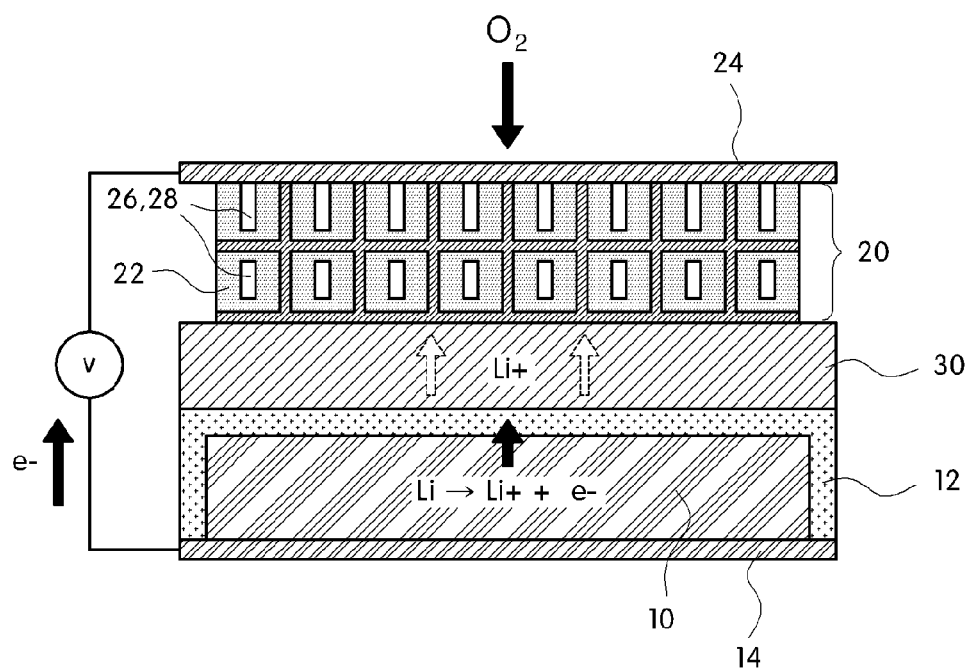
FIGS. 3 and 4 are schematic cross-sectional views showing the lithium-air hybrid battery system in accordance with an exemplary embodiment of the present invention manufactured by the method of FIG. 2.

Reference numerals set forth in the Drawings includes reference to the following elements as further discussed below:

10: lithium metal negative electrode
12: liquid electrolyte
14: negative electrode current collector
20: porous solid electrolyte air positive electrode
22: solid electrolyte
24: positive electrode current collector
26, 28: pores
30: ion conductive glass ceramic
32: metal foam It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

As shown in FIGS. 1 to 5, an exemplary embodiment of the present invention provides a lithium-air hybrid battery system, which has a structure in which a lithium metal negative electrode 10 including a liquid electrolyte 12 is stacked on one side of an ion conductive glass ceramic 30, a porous solid electrolyte air positive electrode 20 having a solid electrolyte 22, is stacked on the other side of the ion conductive glass ceramic 30, and the liquid electrolyte 12 is present just in the lithium metal negative electrode 10.

A method for manufacturing the lithium-air battery in accordance with another exemplary embodiment of the present invention injects a liquid electrolyte 12 (or a polymer electrolyte, a gel electrolyte, etc.) prepared by mixing a lithium salt and a solvent into the top of a lithium metal negative electrode 10 including a negative electrode current collector 14 attached to the bottom thereof. A porous solid electrolyte air positive electrode 20 is then prepared on an ion conductive glass ceramic 30 via coating. The ion conductive glass ceramic 30 coated with the porous solid electrolyte air positive electrode 20 is then fixed onto the liquid electrolyte 12 such that the liquid electrolyte 12 does not leak to the outside. Finally, a porous positive electrode current collector 24 is attached to the top of the porous solid electrolyte air positive electrode 20.

The process for preparing the porous solid electrolyte air positive electrode will be described in more detail below.

First, a slurry for preparing the porous solid electrolyte air positive electrode is formed. That is, a carbon, a catalyst, a binder, a solid electrolyte, a solvent (such as acetone), and a filler (such as dibutyl phthalate (DBP)) are mixed in a predetermined ratio to prepare a slurry. Examples of usable catalysts include a noble metal (such as Pt, Au, etc.), a transition metal (such as Mn, Co, Ni, etc.), a metal oxide (MxOy wherein M is a metal or a mixture of two or more metals), an organic metal compound, etc.

The catalyst serves to improve the reactivity when lithium ions supplied through the electrolyte react with oxygen supplied from outside to produce lithium oxide during discharge and also serves to improve the efficiency of the reaction in which the produced lithium oxide is decomposed into lithium ions and oxygen during charge. Moreover, the catalyst serves to provide a site where the produced lithium oxide is accumulated and to provide a path through which electrons required for the reaction migrate. The binder may include PEO, PVdF or PVdF-HFP, and the solid electrolyte may be a ceramic solid electrolyte, a polymer solid electrolyte, or other material having lithium ion conductivity. Moreover, the solvent may include a solvent capable of volatilizing during drying of the electrode in addition to acetone, and the filler may include any materials that do not react with the slurry material and can be dissolved in an extraction solvent.

Illustratively, the carbon, the catalyst, and the mixture of binder and solid electrolyte are mixed in a ratio of 40%:20%:40%, the solvent is added in an amount that can maintain the concentration of the total solid about 10%, and the filler is added in an amount of 10% with respect to the carbon, thus preparing the slurry.

In an exemplary embodiment, the slurry for preparing the porous solid electrolyte air positive electrode is prepared by mixing 4 g of carbon, 2 g of catalyst, 2 g of binder, 2 g of solid electrolyte, 100 g of solvent (such as acetone), and 0.4 g of filler (such as DBP). Next, the thus prepared slurry is coated on the ion conductive glass ceramic 30 and dried such that the solvent (such as acetone) volatilizes and the slurry is solidified. As a result, as shown in the process diagram of FIG. 2, pores 26 are formed primarily in places where the solvent volatilizes. Then, the slurry coated and dried on the ion conductive glass ceramic 30 is immersed in a methanol solvent, in which the filler is to be dissolved, to extract the mixed filler (such as DBP) such that pores 28 are formed in places where the filler is extracted, thereby preparing the porous solid electrolyte air positive electrode 20 having the pores 28.

Here, the higher the number of pores, the more the contact area with air is increased, and the lithium oxide produced by the reaction between lithium ions and oxygen is accumulated in the pores. In other words, in addition to the pores 26 formed when the solvent volatilizes during the drying of the slurry, a greater number of pores 28 can be formed in places where the filler is extracted by treating the filler (such as DGP) added to the slurry with methanol. The porous positive electrode current collector 24 having an air path is attached to the top of the thus prepared porous solid electrolyte positive electrode 20.

Figure 6:
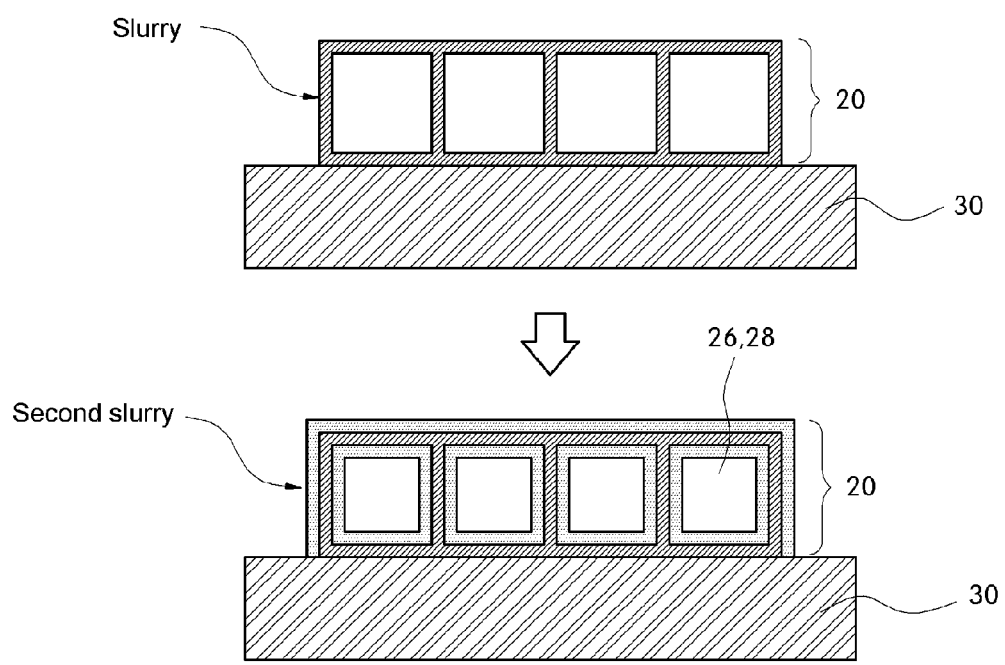
FIG. 6 is a schematic diagram showing a lithium-air hybrid battery system in accordance with still another exemplary embodiment of the present invention.

In another exemplary embodiment of the present invention, as shown in the conceptual diagram of FIG. 6, a solid electrolyte air positive electrode 20 having pores 26 and 28 may be prepared by a first process in which a first slurry prepared by mixing a binder, a solid electrolyte, a solvent, and a filler is coated and dried on an ion conductive glass ceramic 30 to prepare a solid electrolyte support layer having pores and a second process in which a second slurry prepared by mixing a carbon, a catalyst, a binder, a solid electrolyte, a solvent, and a filler is coated on the thus prepared solid electrolyte support layer.

Figure 7:
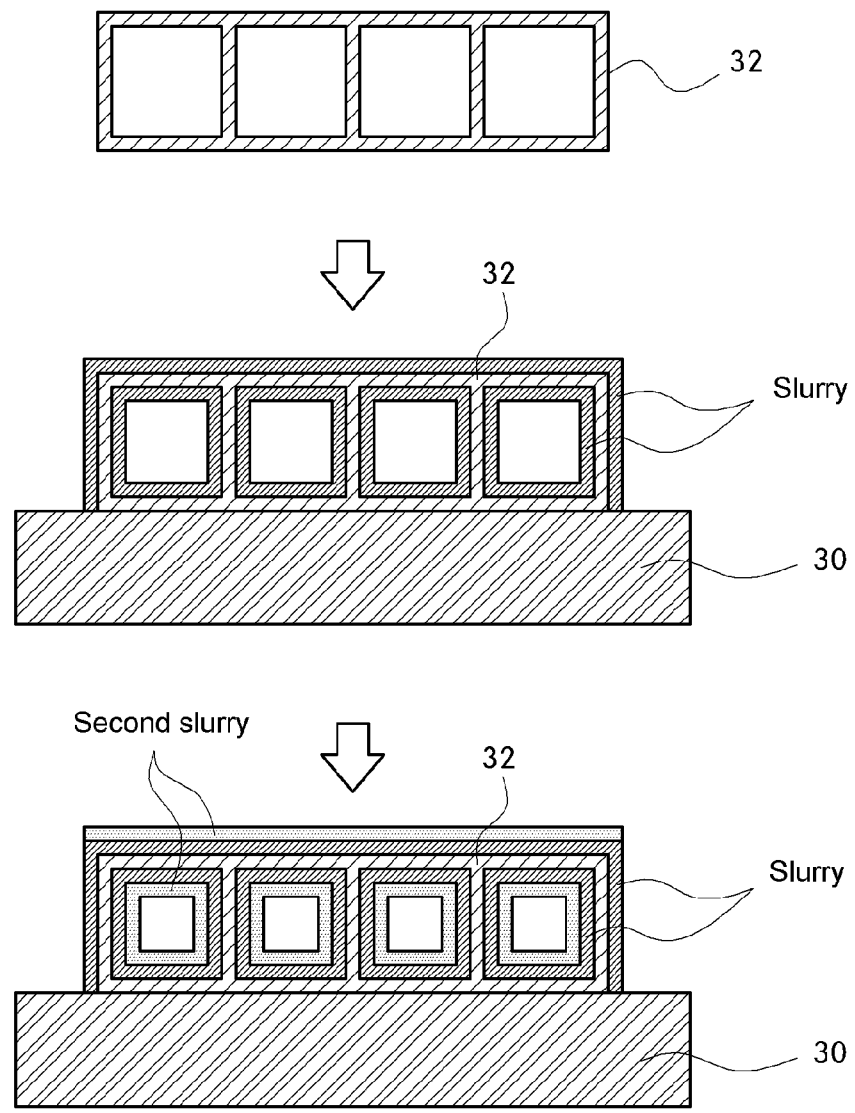
FIG. 7 is a schematic diagram showing a lithium-air hybrid battery system in accordance with yet another exemplary embodiment of the present invention.
Figure 8:
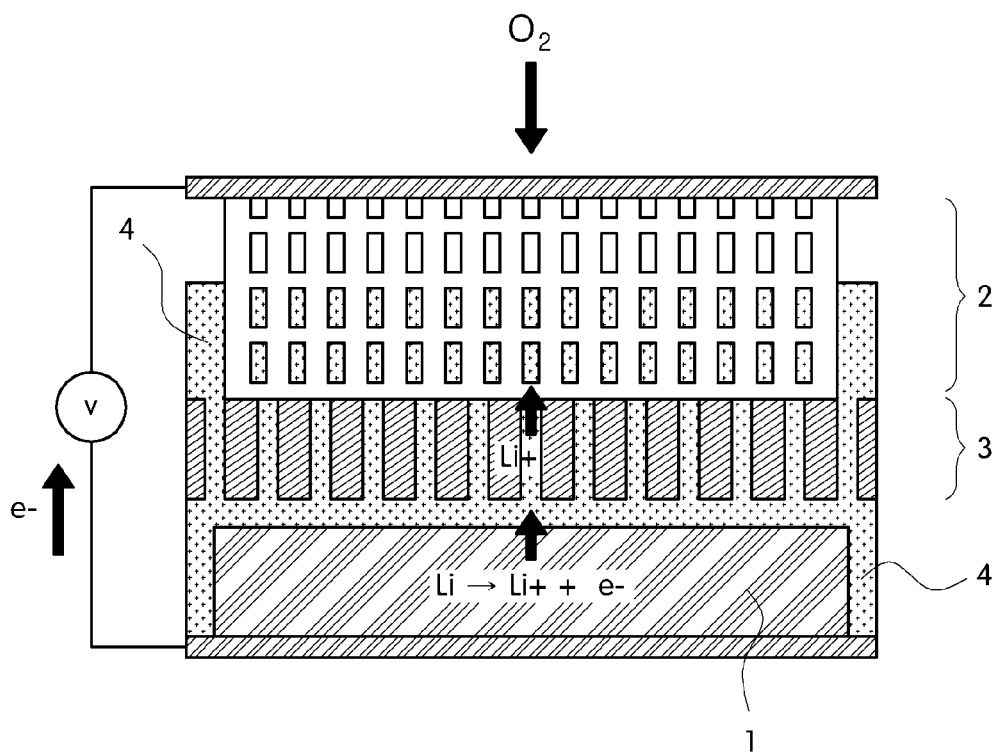
FIG. 8 shows a conventional lithium-air battery in the related arts.

In still another exemplary embodiment of the present invention, as shown in the conceptual diagram of FIG. 7, a porous solid electrolyte air positive electrode may be prepared by thinly coating and drying a solid electrolyte and a binder layer on a metal foam 32 having pores, instead of coating the slurry on an ion conductive glass ceramic 30, and a process of coating a slurry prepared by mixing a carbon, a catalyst, a binder, and a solid electrolyte on the surface of the resulting solid electrolyte air positive electrode using the metal foam 32 may be further performed.

Finally, the ion conductive glass ceramic 30 formed on the thus prepared porous solid electrolyte air positive electrode 20 is stacked and bonded to the lithium metal negative electrode 10, thus manufacturing the lithium-air hybrid battery system of the present invention. That is, the ion conductive glass ceramic 30 coated with the porous solid electrolyte air positive electrode 20 is fixed to the top of the liquid electrolyte 12 injected into the top of the lithium metal negative electrode 10 such that the liquid electrolyte 12 does not leak to the outside using a gasket and the like, thereby manufacturing a lithium-air hybrid battery system of the present invention in which the lithium metal negative electrode 10 and the porous solid electrolyte air positive electrode 20 are stacked on both sides of the ion conductive glass ceramic 30.

Figure 4:
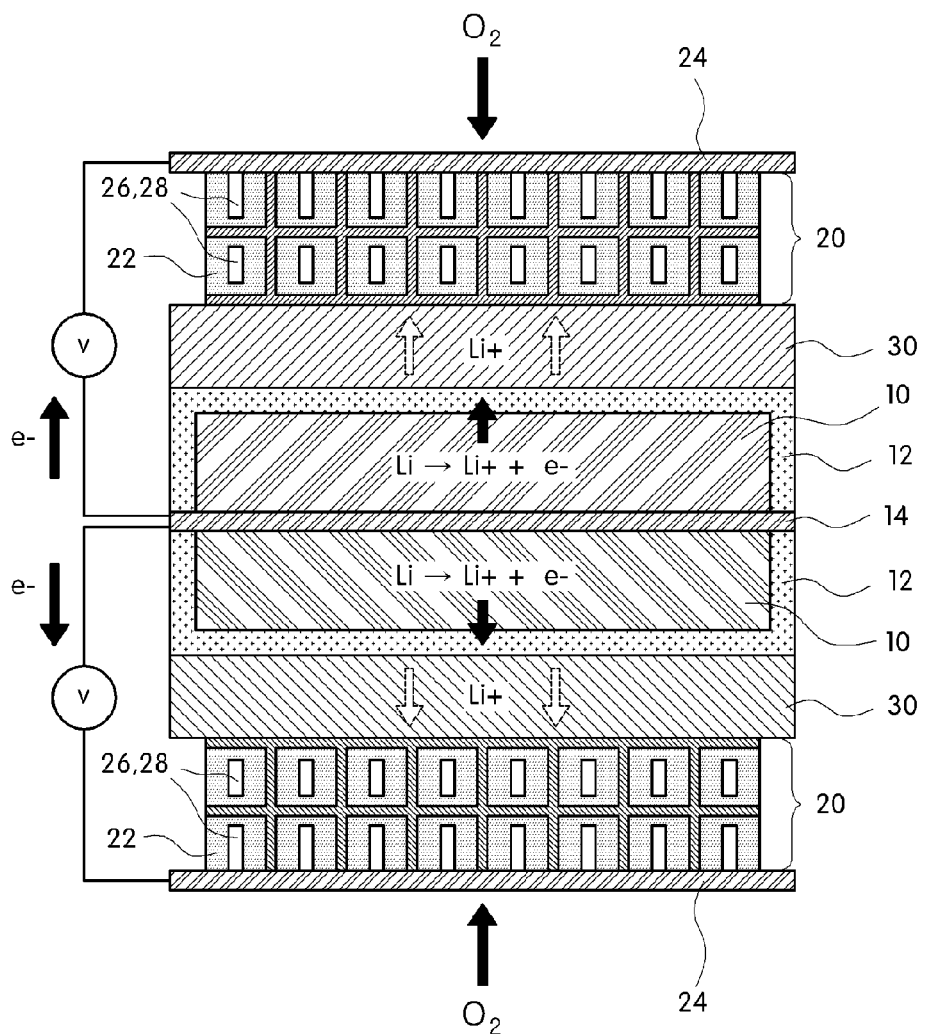
Figure 5:
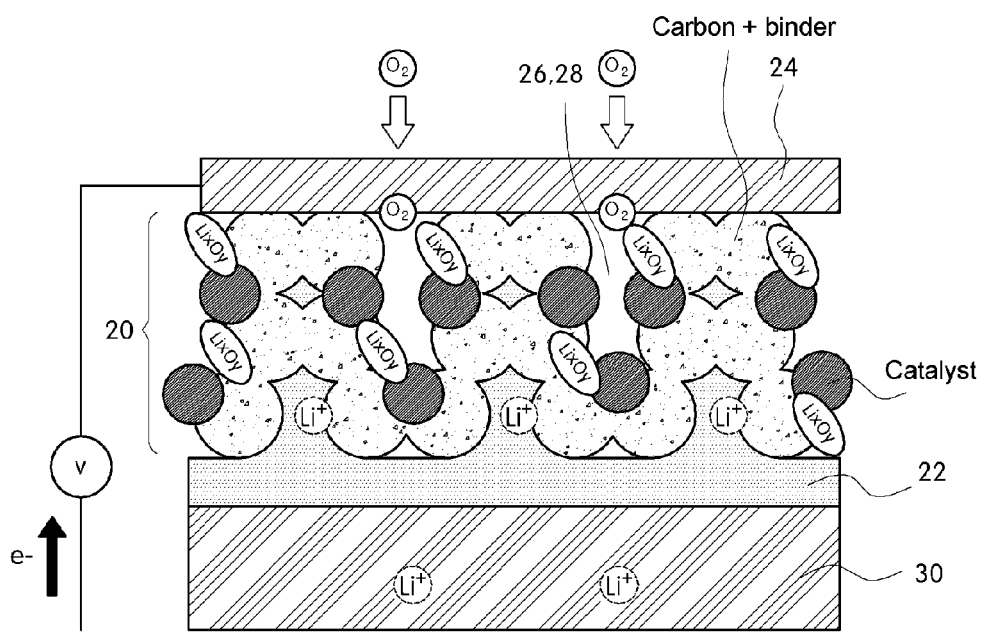
FIG. 5 is a schematic cross-sectional view showing an ideal structure of a lithium-air hybrid battery system in accordance with an exemplary embodiment of the present invention.

Meanwhile, the lithium-air hybrid battery system manufactured in the above manner may be stacked as shown in FIG. 4 and, since the porous solid electrolyte air positive electrode 20 coated on the ion conductive glass ceramic 30 may be stacked in both directions with respect to the lithium metal negative electrode 10 including the liquid electrolyte 12 such that the liquid electrolyte 12 may not be influenced by gravity, thereby increasing the energy density of the battery.

The discharge operation of the lithium-air hybrid battery system of the present invention manufactured by the above manner will now be described. The lithium ions generated from the lithium metal negative electrode 10 migrate to the layer of the ion conductive glass ceramic 30 through the liquid electrolyte 12 and move to the porous solid electrolyte air positive electrode 20 by the migration of ionic point defects in the ion conductive glass ceramic 30. Then, the lithium ions migrating across the ion conductive glass ceramic 30 move along the solid electrolyte 22 of the porous solid electrolyte air positive electrode 20 and react with oxygen supplied from the air to produce lithium oxide by the catalysis on the carbon surface. At this time, charges move from the negative electrode current collector of the lithium metal negative electrode to the positive electrode current collector of the porous solid electrolyte air positive electrode.

As described above, the present invention provides the following effects.

Since the lithium metal negative electrode comprising the liquid electrolyte and the porous air positive electrode comprising a carbon, a catalyst, a binder and a solid electrolyte are separately stacked on both sides of the impermeable ion conductive glass ceramic, it is possible to minimize the amount of liquid electrolyte used and prevent the volatilization of the liquid electrolyte, thereby increasing the lifespan of the battery. In particular, with the use of the ion conductive glass ceramic, it is possible to prevent a side reaction between moisture and lithium metal even when the moisture is introduced from the outside.

Moreover, since the air positive electrode open to the outside does not use the liquid electrode but instead uses the solid electrolyte, it is possible to increase the degree of freedom in the stacking direction of the respective elements of the battery. Further, since the air positive electrode is stacked in both directions with respect to the lithium metal negative electrode, it is possible to increase the energy density of the battery. In addition, due to the non-use of liquid electrolyte in the air positive electrode, the entire area may serve as a reaction site for reaction with air.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a lithium-air hybrid battery, the method comprising:
    injecting a liquid electrolyte prepared by mixing a lithium salt and a solvent onto the top of a lithium metal negative electrode including a negative electrode current collector attached to the bottom thereof;
    preparing a porous solid electrolyte air positive electrode on an impermeable ion conductive glass ceramic by coating, the porous air positive electrode including a carbon, a catalyst, a binder and a solid electrolyte, the porous solid electrolyte air positive electrode including pores that contact with air and serve as reaction sites with the air;
    fixing the impermeable ion conductive glass ceramic coated with the porous solid electrolyte air positive electrode onto the liquid electrolyte so that the liquid electrolyte is present just on the lithium metal negative electrode without being present in the porous air positive electrode; and
    attaching a porous positive electrode current collector having an air path to the top of the porous solid electrolyte air positive electrode;
    wherein the preparing the porous solid electrolyte air positive electrode comprises:
    preparing a slurry by mixing the carbon, the catalyst, and a mixture of binder and solid electrolyte in a ratio of 40%:20%:40%, in which the binder and the solid electrolyte are mixed in a ratio of 50%:50%, by adding the solvent in an amount that maintains the concentration of the total solid about 10%, and by adding a filler in an amount of 10% with respect to the carbon;
    coating the prepared slurry on the impermeable ion conductive glass ceramic and drying the coated slurry;
    allowing the solvent to volatilize during the drying such that the pores are formed in places where the solvent volatilizes;
    and immersing the slurry coated and dried on the impermeable ion conductive glass ceramic in a solvent, in which the filler is to be dissolved, to extract the filler such that pores are formed in places where the filler is extracted.

2. The method of claim 1, wherein the binder is any one selected from the group consisting of PEO, PVdF and PVdF-HFP.

3. The method of claim 1, wherein the solid electrolyte is a material having lithium ion conductivity such as a ceramic solid electrolyte or a polymer solid electrolyte.

4. The method of claim 1, wherein the solvent is acetone capable of volatilizing.

5. The method of claim 1, wherein the filler is dibutyl phthalate (DBP).

6. The method of claim 1, further comprising coating the slurry prepared by mixing the carbon, the catalyst, the binder, and the solid electrolyte on the outer surface of the solid electrolyte air positive electrode again.

* * * * *